United States Patent
Sylthe et al.

(10) Patent No.: US 7,725,813 B2
(45) Date of Patent: May 25, 2010

(54) METHOD FOR REQUESTING AND VIEWING A PREVIEW OF A TABLE ATTACHMENT ON A MOBILE COMMUNICATION DEVICE

(75) Inventors: Olav A. Sylthe, Atlanta, GA (US); Jianwei (Oliver) Yuan, Cumming, GA (US); Dan Dumitru, Atlanta, GA (US)

(73) Assignee: Arizan Corporation, Atlanta, GA (US)

( * ) Notice: Subject to any disclaimer, the term of this patent is extended or adjusted under 35 U.S.C. 154(b) by 1128 days.

(21) Appl. No.: 11/093,853

(22) Filed: Mar. 30, 2005

(65) Prior Publication Data

US 2006/0225001 A1  Oct. 5, 2006

(51) Int. Cl.
*G06F 17/00* (2006.01)
(52) U.S. Cl. .................... 715/212; 715/218
(58) Field of Classification Search ........... 715/238, 715/215, 255, 221–225, 212, 218, 253
See application file for complete search history.

(56) References Cited

U.S. PATENT DOCUMENTS

| 6,523,040 | B1 | 2/2003 | Lo Ming-Ling et al. |
| 7,299,406 | B2 * | 11/2007 | Schnurr ............ 715/212 |
| 2002/0087593 | A1 * | 7/2002 | Rank ............ 707/503 |
| 2002/0161796 | A1 | 10/2002 | Sylthe |
| 2004/0133848 | A1 | 7/2004 | Hunt et al. |

FOREIGN PATENT DOCUMENTS

| WO | 00/39666 A1 | 7/2000 |
| WO | WO 02/44953 A | 6/2002 |
| WO | WO 2004/042507 A | 5/2004 |

OTHER PUBLICATIONS

European Examination Report for EP 05102485.9 dated Feb. 15, 2010.

* cited by examiner

*Primary Examiner*—Stephen S Hong
*Assistant Examiner*—Manglesh M Patel
(74) *Attorney, Agent, or Firm*—Stephen A. Bucchianeri; Brij K. Agarwal; Eckert Seamans Cherin & Mellott, LLC

(57) ABSTRACT

A process is set forth for previewing a table attachment on a mobile communication device, and upon identifying table content of interest viewing and/or retrieving the entire table from an attachment server. In one embodiment, a small 4×4 row/column preview is presented on the device of every table found in a document attachment, with the cell content textual information limited to the requesting device display capabilities. This limitation avoids any requirement to download large amounts of individual cell content to the device. Thus, the user is able to quickly identify which tables are of interest and then request a full table download from the attachment server in an on-demand fashion. In this regard, the preview table itself preferably also functions as a link to the full table stored at the server to facilitate easy retrieval to the device for viewing in a spreadsheet view.

9 Claims, 12 Drawing Sheets

⊡ Change Request Form_Preview Table.doc

[Table:1]

[Table:2]

[Table:3]

[Table:5]

⊡ Change Request Form_Preview Table.doc

| [Table:1] | |
|---|---|
| Project Info | |
| Project Name | 4.0 Java han |
| Project Mana | |

| [Table:2] | | |
|---|---|---|
| Change Ident | | |
| Change Reque | Preview View | Priority Lev |
| Requested By | Olav A. Sylt | |
| Phone Number | | ▼ |

METHOD FOR REQUESTING AND VIEWING A PREVIEW OF A TABLE ATTACHMENT ON A MOBILE COMMUNICATION DEVICE

FIELD

The following is directed in general to displaying content on mobile communication devices, and more particularly to a method for previewing a table attachment on a mobile communication device.

BACKGROUND

Mobile communication devices are becoming increasingly popular for business and personal use due to a relatively recent increase in number of services and features that the devices and mobile infrastructures support. Handheld mobile communication devices, sometimes referred to as mobile stations, are essentially portable computers having wireless capability, and come in various forms. These include Personal Digital Assistants (PDAs), cellular phones and smart phones. While their reduced size is an advantage to portability, limitations in download bandwidth and device screen size give rise to challenges in viewing large documents with multiple embedded tables, having a large number of columns and rows for presenting information in a tabular format.

For wireless devices that support viewing of attachments, this represents a large amount of information for downloading, requiring a large amount of bandwidth and the associated cost thereof. Additionally, the user must wait for an extended period of time while the device is downloading the complete table.

Since mobile communication devices have limited screen real estate, it is known in the art to provide an Attachment Server (AS) for delivering "on-demand" content to wireless device users in order to minimize bandwidth, and device CPU/memory usage. When the user of a wireless device views a document attachment that uses tables, the Attachment Server typically downloads the document text to the Attachment Viewer (AV) on the mobile device along with a selectable link (e.g. [Table: N]), rather than the entire table contents. The user can then retrieve the entire table, if desired, by selecting the link. By downloading only the text and a link to the table, and providing the user with an option for retrieving or viewing the entire table attachment, such existing architectures thereby adhere to the on-demand design principle set forth above.

Unfortunately, the selectable link (e.g. [Table: N]) provides no information relating to the actual content of the table. Some documents use tables extensively to present information. Indeed, in some cases the entire document is created using only tables containing the entire textual content. These types of table-centric documents, when viewed on the wireless device through the foregoing on-demand architecture, are represented only by a large number of selectable table links, without any other textual information. For these types of documents the user is unable to discern which of the table(s) contain information that is relevant to them and thus should be retrieved. The user is therefore required to retrieve some, if not all, of the tables in the document in order to identify any table(s) of interest. Consequently, the design principle of offering on-demand retrieval, wherever possible, is defeated by such multiple downloads of irrelevant attachment parts.

SUMMARY

According to one aspect, a method is provided for previewing a table attachment on a mobile communication device, and upon identifying table content of interest viewing and/or retrieving the entire table.

In one embodiment, a small 4×4 row/column preview is presented on the device of every table found in a document attachment, with the cell content textual information limited to the requesting device display capabilities (e.g. typically 8-32 characters per cell). This limitation avoids any requirement to download large amounts of individual cell content to the device, which otherwise would defeat the on-demand architectural design principle.

Thus, the embodiments set forth herein allow the user to quickly identify which table(s) is (are) of interest and then request full table download from the Attachment Server in an on-demand fashion. In this regard, the preview table itself preferably also functions as a link to the full table stored at the server to facilitate easy retrieval to the device for viewing in a spreadsheet view.

Additional aspects and advantages will be apparent to a person of ordinary skill in the art, residing in the details of construction and operation as more fully hereinafter described and claimed, reference being had to the accompanying drawings.

BRIEF DESCRIPTION OF THE DRAWINGS

A detailed description of the preferred embodiment is set forth in detail below, with reference to the following drawings, in which:

FIG. 2 is a device screen display of a plurality of table attachments, according to the prior art;

FIG. 3 is a device screen display showing preview of a plurality of table attachments as in FIG. 2, according to an embodiment;

FIGS. 4A and 4B are device screen displays showing menu command options for retrieving and viewing, respectively, the previewed table attachment of FIG. 3;

FIG. 5 is a device screen display showing the retrieved table of FIGS. 4A and 4B;

DETAILED DESCRIPTION OF THE PREFERRED EMBODIMENT

Figure 1:
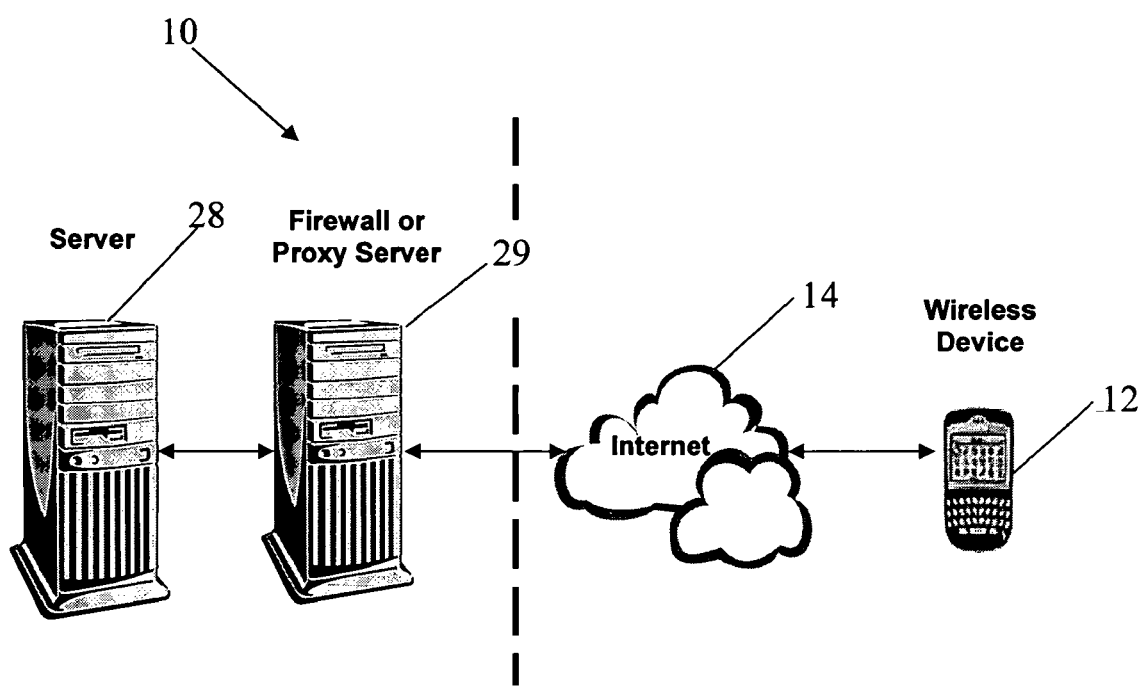
FIG. 1 is a block diagram of a network environment in which the preferred embodiment may be practiced.

With reference to FIG. 1, network environment 10 is shown in which the preferred embodiment may be practiced. Network environment 10 includes at least one mobile communication device 12 communicating via a wireless network/Internet 14 to a server 28, via a firewall security server 29, for downloading document attachments to the devices 12. While only one server 28 is shown for illustration purposes, a person of skill in the art will understand that network environment 10 could have many such servers for hosting web sites or graphic download sites, providing access to picture files such as JPEG, TIFF, BMP, PNG, SGI, MP4, MOV, GIF, SVG, etc. As would be understood by one of ordinary skill in the art, wireless networks 14 include GSM/GPRS, CDPD, TDMA, iDEN Mobitex, DataTAC networks, or future networks such as EDGE or UMTS, and broadband networks like Bluetooth and variants of 802.11.

As discussed above, for documents that use embedded tables, or for documents that are constructed using only tables the existing "on-demand" architecture displays a series of embedded links to the tables, as shown in FIG. 2. This forces the user to retrieve each and every table in order to view the table content, which is a time/bandwidth consuming operation if the user only needs information from one or a few of the tables.

Figures 4A, 4B, 5:
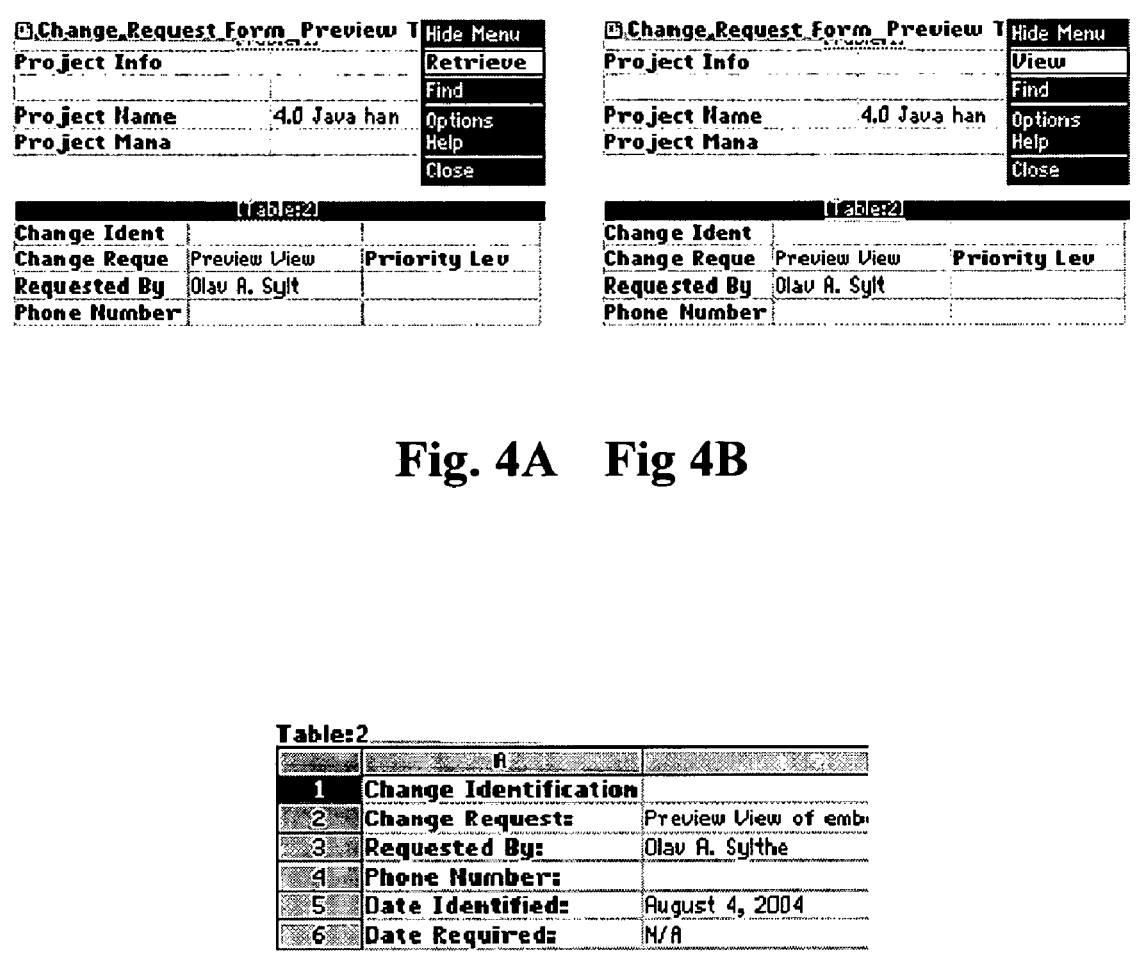

The table preview feature set forth herein, presents the user with a small preview of the table content on a mobile device 12 in "Document View", as show in FIG. 3. Specifically, the table preview feature displays the first 4 columns/rows of an embedded table in order to quickly give the user an idea of what the table content is. In order to view the full table, the "Table Link" header in the preview acts as a selectable link and "Retrieve" is available from the menu when clicking the track wheel of device 12, as shown in FIG. 4A. The full table can then be viewed in "Spreadsheet View" using the "View" command, as shown in FIG. 4B.

Finally, the full table in the document can be viewed in Spreadsheet View after it has been successfully been retrieved from the Attachment Service, as shown in FIG. 5.

Before turning to the specifics of the client-side and server-side applications for the table preview feature, a description is provided herein of the structure of a Document Object Model (DOM) for a document attachment to be viewed on the mobile communication device 12.

The attachment server 28 uses a file-parsing distiller in the preferred embodiment, for a specific document type, to build an in-memory Document Object Model (DOM) structure representing an attachment of that document type. The document DOM structure is stored in a memory cache of server 28, and can be iterated bi-directionally.

Figure 6:
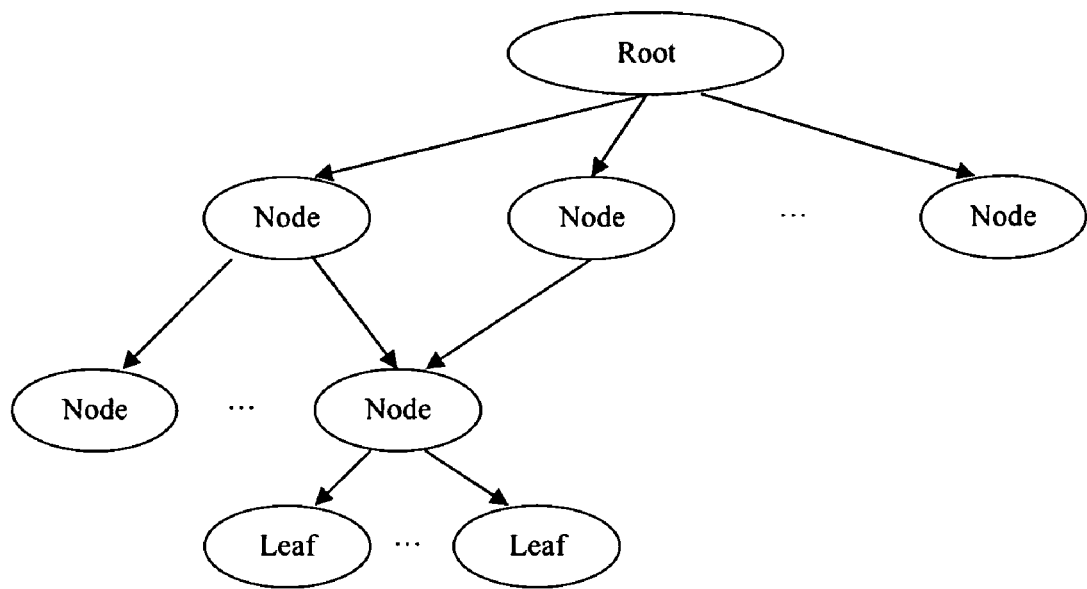
FIG. 6 is a tree diagram showing the basic structure of a Document Object Model (DOM)

As shown in FIG. 6, the graph-based document DOM structure consists of nodes and leaves. The nodes serve as the parents of leaves and nodes, while leaves are end points of a branch in the graph. Each node and leaf can have a set of attributes to specify its own characteristics. For example, a paragraph node can contain attributes to specify its alignment, style, entry of document TOC, etc. In addition, each of the nodes and the leaves has a unique identifier, called a DOM ID, to identify itself in the document DOM structure.

The document DOM structure is divided into three parts: top-level, component and references. The top level refers to the document root structure, while the main document is constructed in the component and the references represent document references to either internal or external sub-document parts. The following paragraphs examine each part in detail.

Figure 7:
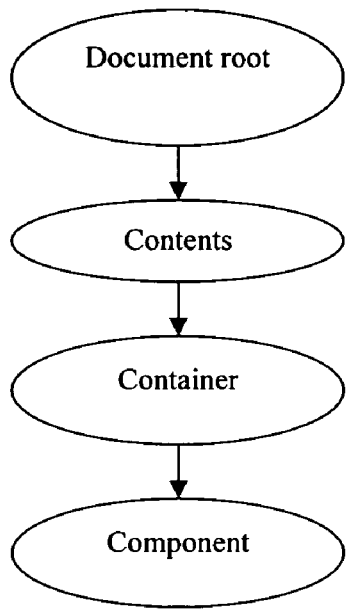
FIG. 7 shows the top-level of the DOM structure in FIG. 6.

The root node of a document DOM structure, referred to as "Document", contains several children nodes, referred to as "Contents", which represent different aspects of the document contents. Each "Contents" node contains one or multiple "Container" nodes used to store various document global attributes. The children of the "Container" nodes are components, which store the document structural and navigational information. When the attachment server 28 builds the DOM structure for an attachment file for the first time, the top-level structure is a single parent-child chain as shown in FIG. 7:

Three types of components are defined by the attachment server 28: text components, table components and image components, which represent text, tables and images in a document, respectively. The text and table components are described in detail below, and the image component structure is identical.

A component consists of a hierarchy of command nodes. Each command represents a physical entity, a property, or a reference defined in a document. For the text component, the physical entity commands are page, section, paragraph, text segments, comments, footnote and endnote commands, which by name define the corresponding entity contained in a document. The property commands for the text component are font, text color, text background color, hyperlink start/end and bookmark commands. The text component has only one reference command, referred to as the text reference command, which is used to reference a subdocument defined in the main body of a document. Usually, the children of a text component are page or section command nodes that, in turn, comprise a set of paragraph command nodes. The paragraph command can contain one or multiple nodes for the remaining command types.

Figure 8:
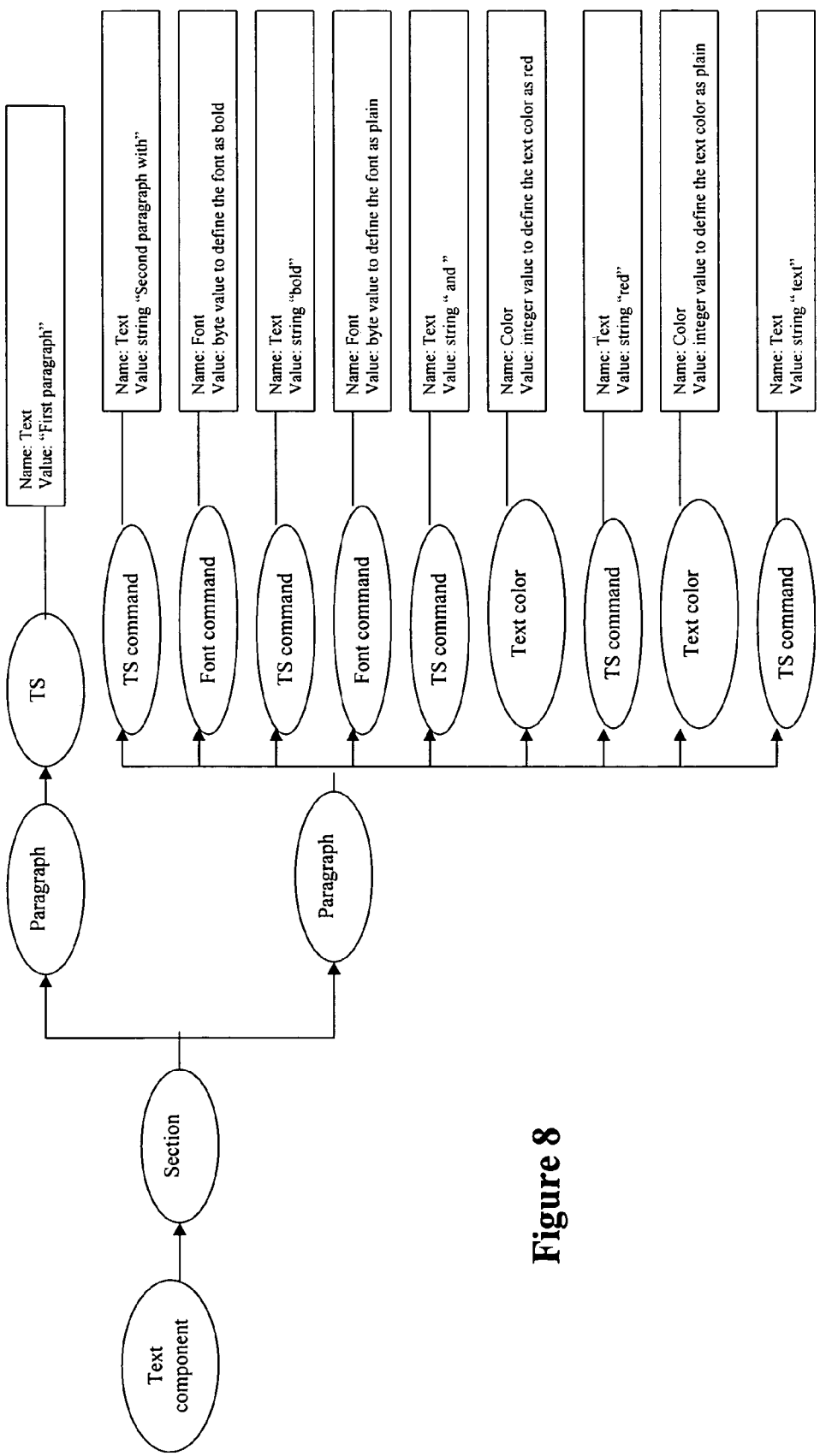
FIG. 8 shows an exemplary DOM structure for a word processing document.

Using the following sample text document, the corresponding document DOM structure is shown in FIG. 8:

---
First paragraph.
Second paragraph with bold and red text.

---

As FIG. 8 demonstrates, the section command, which is the child of the text component, consists of two paragraph commands. The first paragraph command contains one text segment command and the text content for that paragraph is added as an attribute to the text segment command. The second paragraph command has a relatively more complex structure, as the text properties in the paragraph are much richer. Each time a text property (font, text color, etc) changes, a corresponding text property command is created and the change value is added to that command as an attribute. The subsequent text segment command records the text with the same text property as an attribute. As document structure gets richer and more complex, more commands of corresponding types are created and the document properties are added as attributes to those commands.

The table component has the same three types of commands as the text component, but different command names. The document DOM structure for the sample table document below is shown in FIG. 9:

| Cell One | Cell Two |
|----------|----------|
| Cell Three | Cell Four |

Figure 9:
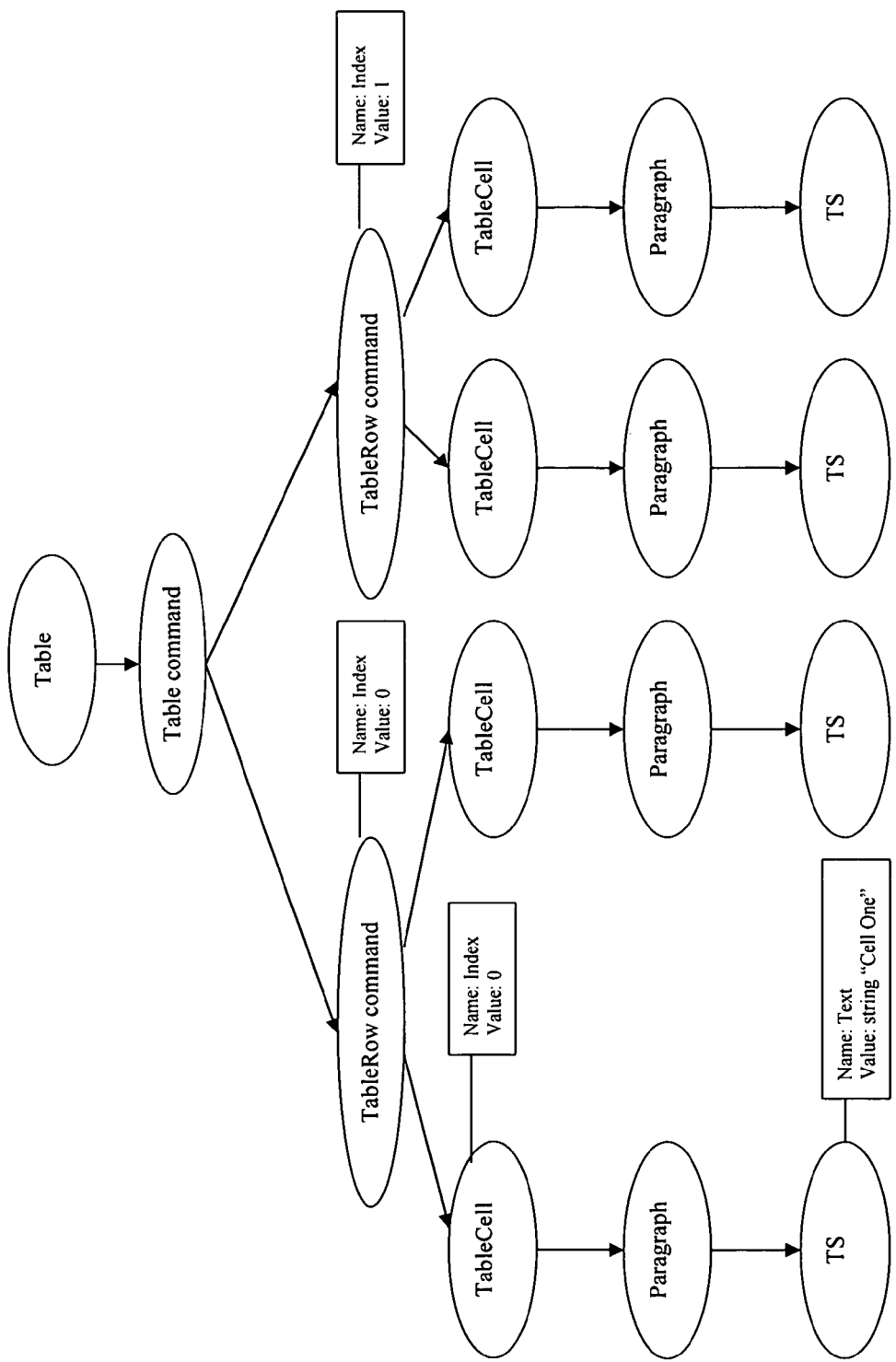
FIG. 9 shows an exemplary DOM structure for a table document.

As shown in the FIG. 9, the table component has physical entity type commands of table, tablerow and tablecell, where the tablecell command can contain all available commands for the text component. In the example above, the first child TableRow command of the table command has an attribute "Index" defined by value of 0. This indicates that the indicated table row is the first one defined in the table. The attribute of the leftmost table cell command in FIG. 9 has the same meaning.

A document sometimes contains subdocuments, for example images, tables, text boxes etc. The DOM structure set forth herein uses a reference command to point to the graph of such subdocuments. Thus, for the following sample document, the attachment server 28 generates the DOM structure shown in FIG. 10:

This document has subdocument of images like this one▨
Second paragraph contains the image▨

Figure 10:
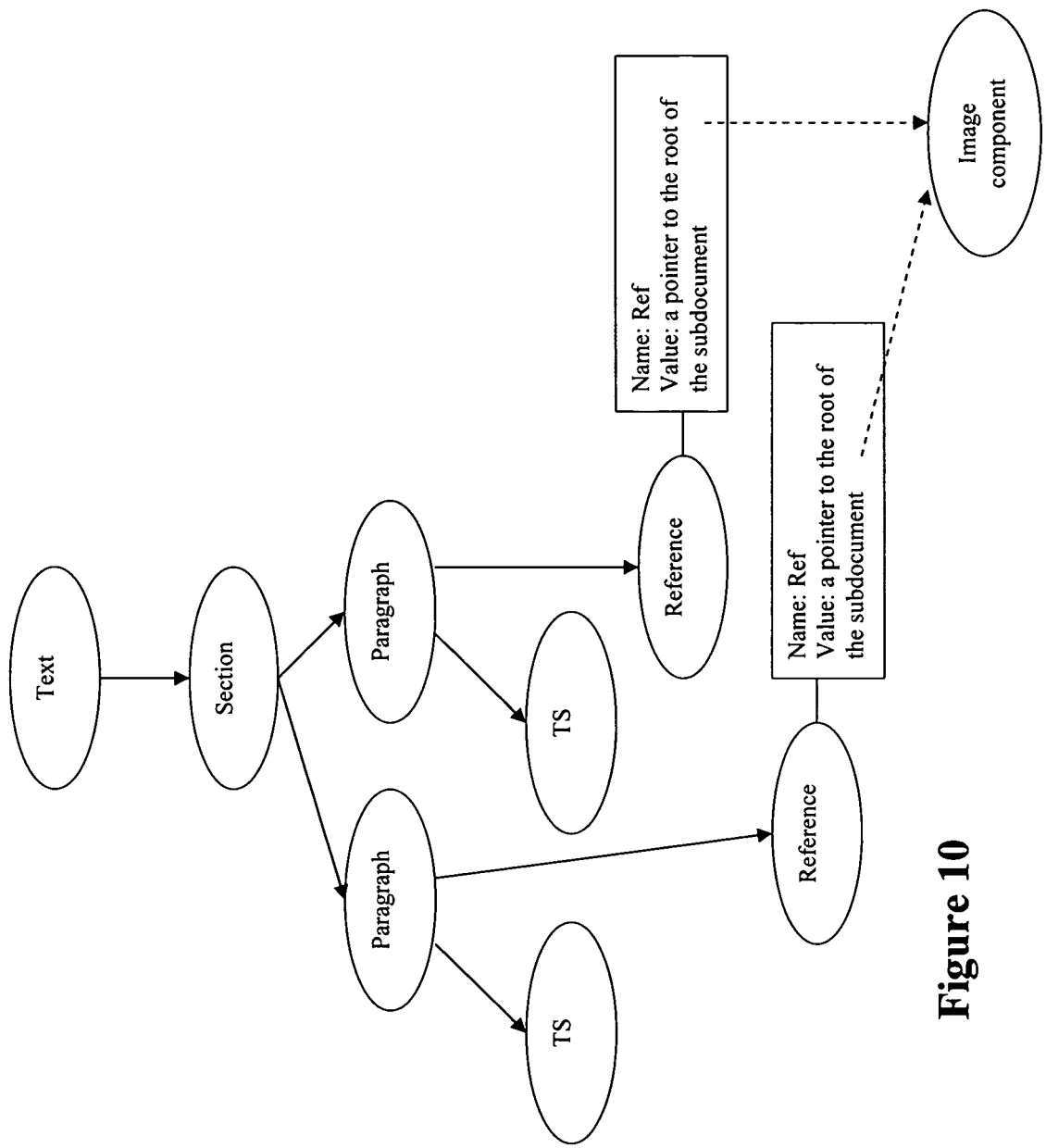
FIG. 10 shows an exemplary DOM structure for a word processing document containing an image subdocument.

The structure shown in FIG. 10 is identical to that discussed above in connection with FIGS. 8 and 9, except for the attributes of the two reference commands. The attachment server 28 constructs the image in "Sample Three" as a separate image component, which contains all of the image data in its own DOM hierarchy. In the DOM structure for the main document, the values of the "Ref" attributes of those two reference commands point to the image component, as indicated by the dashed lines, such that the DOM structure connects together all parts of the document.

Returning now to the preferred embodiment, the client component (Attachment Viewer (AV) application on device 12), when requesting a document attachment conversion from the server component (Attachment Server (AS) 28), informs the server of its device and feature specific capabilities such as screen size, color capabilities and functionality support when requesting an operation. This allows the server 28 to tailor its response to the requesting device 12 and optimize bandwidth utilization and minimize device CPU/storage usage while preserving the device presentation capabilities (e.g. color presentation data will not be returned to a monochrome device and vice versa).

For the table preview capability, the client (AV) will as part of the attachment conversion request inform the server 28 that it is capable of showing table previews as well as supplying the requesting device 12 screen resolution and color information.

This information enables the server 28 to return UCS (Universal Content Stream) data back to the device 12 containing preview table information preferably for a 4×4 row/column table with individual cell content limited to between 8-32 characters based on the requesting device screen information as well as preview table color information if supported by the device. A DOM ID for the full table is also returned to the AV on device 12 that allows the user to request the full table for viewing in spreadsheet view, if desired.

Figure 11:
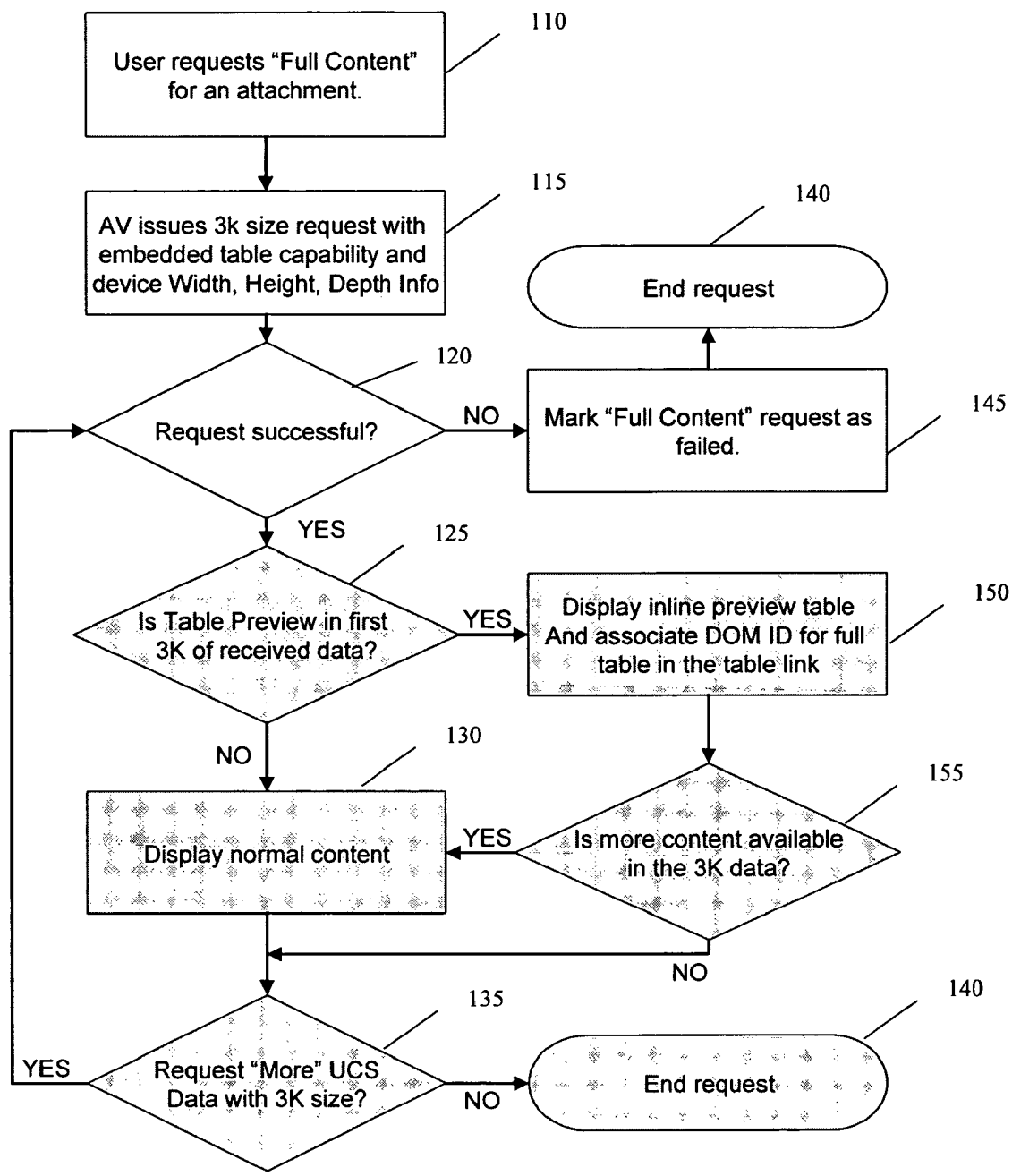
FIG. 11 is a flowchart showing a client-side process for previewing a table attachment using an attachment viewed on a mobile communication device.

A flow chart of the device side request process is shown in FIG. 11. At step 110, the user requests the full content of an attachment (e.g. an attachment to an email), by appropriate operation of the user interface for device 12. In response, at step 115, the device AV issues a document request to the AS server 28 for the first chunk (e.g. typically 3K) of the document attachment configured for the device display width, height and number of colors the device can display.

If the download request is successful (a YES branch at step 120), the client-side AV determines whether a table preview is included in the first portion (e.g. 3K of downloaded data. If not (step 125), the device displays the normal text content (step 130).

The AV then issues any further requests for additional chunks of the document attachment (a YES at step 135), and process flow returns to step 120. Otherwise, if the entire document has been downloaded (a NO at step 135), then the process terminates (step 140).

If a request to download a chunk of data from the AS on server 28 is unsuccessful (i.e. a NO at step 120), then an error flag is generated and an error message displayed (step 145), following which the process terminates (step 140).

If, as step 125, a table preview is included in the chunk of downloaded data the AV displays the table preview, as shown in FIG. 3, and associates the DOM ID for the full table (stored in server 28) in the table link (step 150). If additional content (beyond the table preview) is available in the data chunk for viewing (step 155), the additional content is displayed (step 130). Otherwise, process flow branches to step 135.

Turning now to the server-side process, when the attachment server 28 receives a document containing embedded tables, it first constructs the DOM structure for the document if it does not already exist in the in-memory DOM structure cache. Each embedded table in the file is constructed as an external table component and is added to the DOM structure as an attribute of an external component reference (ECR) command, as described in greater detail below.

Figure 12:
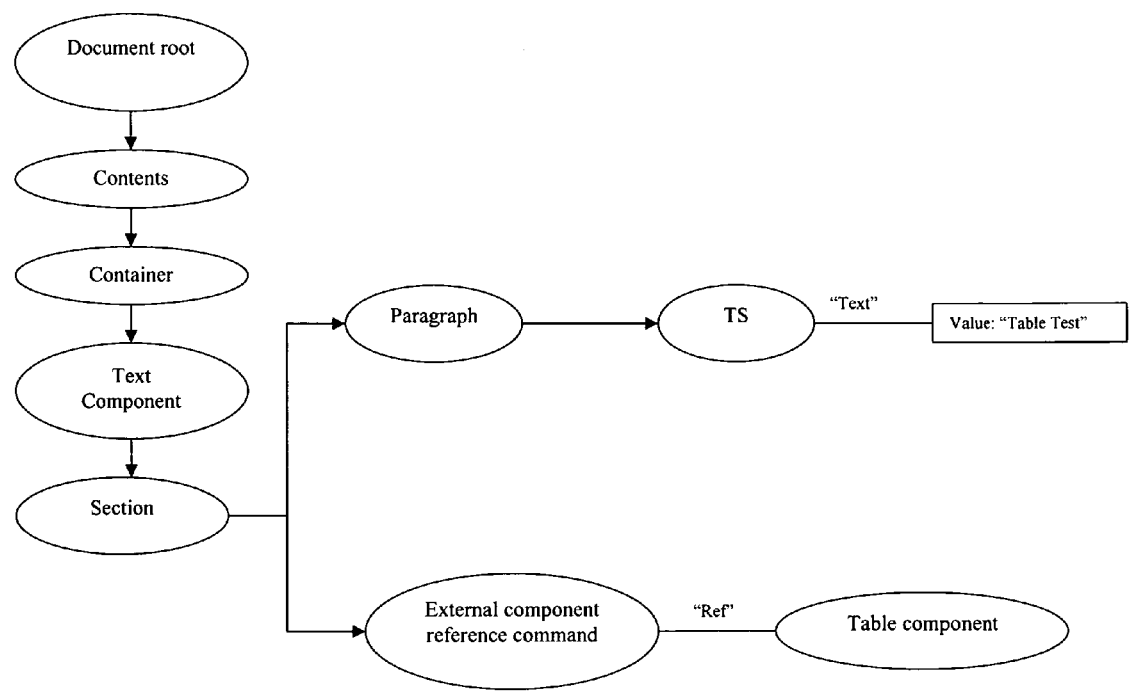
FIG. 12 is a DOM structure graph presentation of a sample document containing a referenced table component added to the DOM structure as an attribute of an external component reference (ECR) command.

The corresponding DOM structure for the following sample document containing an embedded table, is shown in FIG. 12 where, in order to simplify the graph, the DOM structure does not contain the detailed graph presentation for the embedded table:

| Table Test | |
|----------|----------|
| Cell One | Cell Two |
| Cell Three | Cell Four |

As shown in FIG. 12, the table component is added as attribute "Ref" to the external component reference command (ECR), which is a node in the DOM graph structure for the main document.

Figure 13:
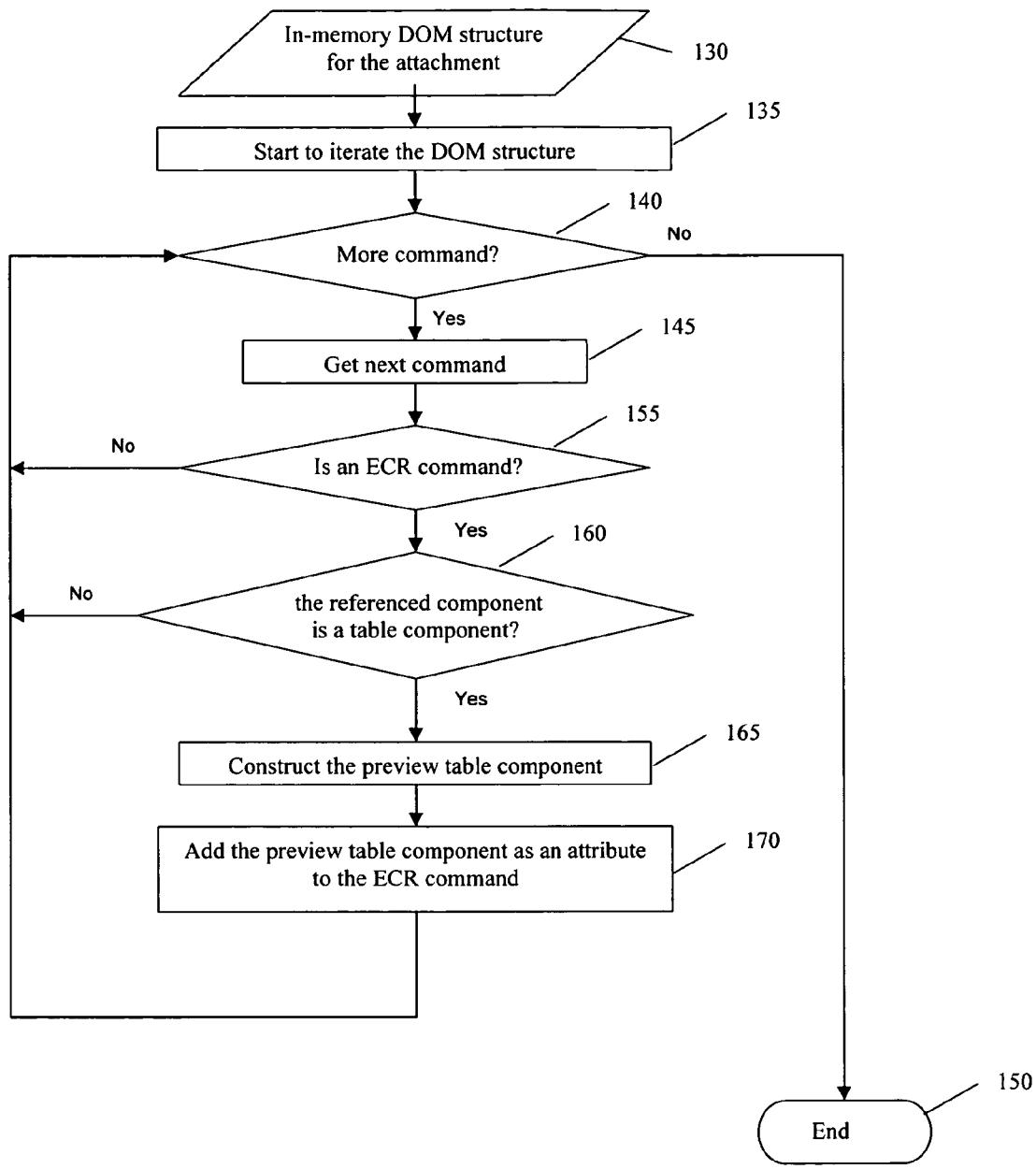
FIG. 13 is a flowchart showing a server-side process for constructing a table component as a preview for the referenced table component of FIG. 12, and adding the preview table component as an attribute to the ECR command for previewing a table attachment.

The server-side process of FIG. 13 begins at step 135 to iterate through the entire document DOM structure 130. Provided the un-iterated remaining portion of the DOM structure continues to contain commands (step 140), the next command is iterated (step 145). Otherwise, the process ends (step 150). If the process encounters an ECR command (step 155) and the component being referenced is a table (step 160), the process constructs a table component (step 165), which is a preview for the referenced table component. This preview table component is added as an attribute to the ECR command (step 170), as shown in FIG. 14.

The preview table component contains only partial information about the referenced table. By default, as discussed above, the preview table preferably has only a maximum of 4 rows and 4 columns of the original table, and each table cell includes up to 16 characters. However, a person skilled in the art will understand that the numbers of table rows, columns and table cell characters are configurable and can be dynamically set in the conversion request. In addition the table formatting information is preserved in the preview table component.

After the preview table component is constructed, it is added as an attribute to the original ECR command, as discussed above. During the response and resulting DOM graph construction for a conversion request, the attachment server 28 persists the ECR command and the attached preview table component with its formatting properties. The flow chart of FIG. 15 sets forth the steps of persisting the ECR command and attached preview table component in the document DOM structure of FIG. 14 with the required formatting properties.

Figure 14:
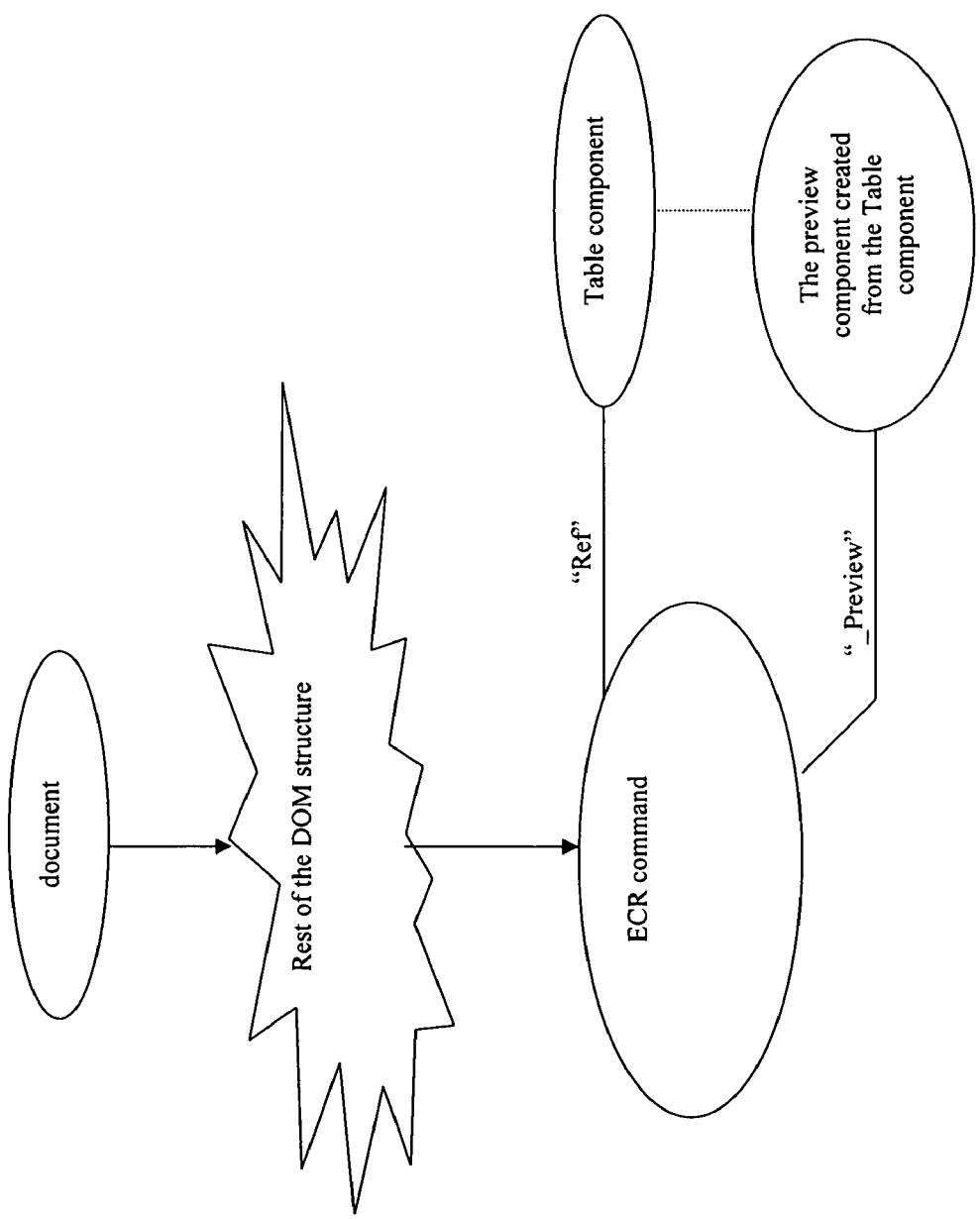
FIG. 14 is a DOM structure graph presentation of the document in FIG. 12 following the process of FIG. 13.
Figure 15:
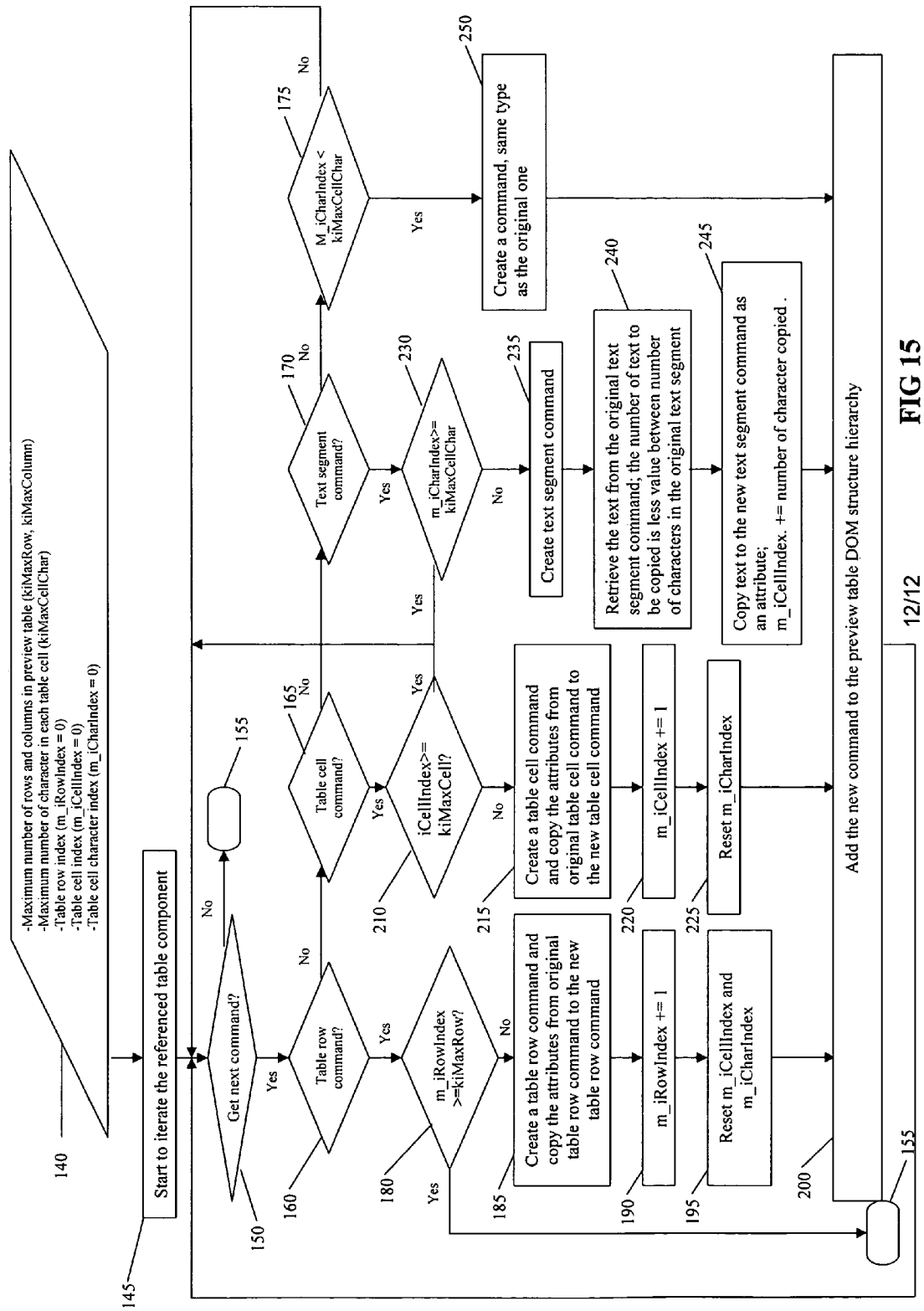
FIG. 15 is a flowchart showing a server-side process for persisting the ECR command and the attached preview table component with its formatting properties to construct the preview table.

After initialization of variables (140), the server process iterates the referenced table component (step 145) extracted from the ECR command shown in FIG. 14. Provided that there are commands remaining to be iterated (step 150), a determination is made as to whether the next command is a Table Row command (step 160), Table Cell command (step 165), Text Segment command (step 170), or whether (step 175) the table cell character index (m_iCharIndex) is less than the maximum number of character in each table cell (kiMaxCellChar). If the result of each of these determinations is NO, then process flow returns to step 150. On the other hand, if there are no further commands then the process ends (step 155).

If the next command is a Table Row command (step 160), a determination is made at step 180 as to whether the Table row index (m_iRowIndex) exceeds the maximum number of rows in the preview table (kiMaxRow). If no, then a table row command is created and the attributes from the original table row command are copied to the new table row command (step 185), the table row index (m_iRowIndex) is incremented (step 190), the table cell index (m_iCellIndex) and Table cell character index (m_iCharIndex) are reset (step 195), and the new command is added to the preview table DOM structure hierarchy (step 200).

If the next command is a Table Cell command (step 165), a determination is made at step 210 as to whether the table cell index (m_iCellIndex) exceeds the maximum number of cells in the preview table (kiMaxCell). If no, then a table cell command is created and the attributes from the original table cell command are copied to the new table cell command (step 215), the table cell index (m_iCellIndex) is incremented (step 220), the table cell character index (m_iCharIndex) is reset (step 225), and the new command is added to the preview table DOM structure hierarchy (step 200). If at step 210 the table cell index (m_iCellIndex) does not exceed the maximum number of cells in the preview table (kiMaxCell), then process flow returns to step 150.

If the next command is a Text Segment command (step 170), a determination is made at step 230 as to whether the table cell character index (m_iCharIndex) is less than the maximum number of characters in each cell (kiMaxCellChar). If yes, then a text segment command is created (step 235), then at step 140 the text from the original text segment command is copied, where the amount of text to be copied is the lesser of the number of characters in the original text segment and (kiMaxCellChar—m_iCharIndex). At step 245, the copied text is added to the new text segment command as an attribute, where m_iCellIndex. +=number of character copied. The new command is then added to the preview table DOM structure hierarchy (step 200). If at step 230 the table cell character index (m_iCharIndex) is not less than the maximum number of characters in each cell (kiMaxCellChar), then process flow returns to step 150.

If at step 175 the table cell character index (m_iCharIndex) is less than the maximum number of character in each table cell (kiMaxCellChar), then a command is created (step 250) that is of the same type as in the original document. The new command is then added to the preview table DOM structure hierarchy (step 200).

In summary, since the preview table for a table component is cached in the DOM structure as an attribute of the corresponding ECR command, memory consumption is slightly increased. However the processing time is significantly reduced by eliminating extra iterations of the table component on repeated file conversion requests.

A person skilled in the art, having read this description of the preferred embodiment, may conceive of variations and alternative embodiments.

All such variations and alternative embodiments are believed to be within the ambit of the claims appended hereto.

What is claimed is:

1. A process for previewing on a mobile communication device at least one table embedded in a document stored in a server, comprising:

building a graph structure within said server representing a map of said document, including a table component representing each said table;

issuing a request for said document from said mobile communication device to said server including an indication of display capabilities for said device;

iterating said graph structure within said server and for each said table component constructing and adding a preview table component as an attribute to an external component reference command, wherein said preview table component includes a predetermined number of rows and columns of said table with cell content textual information limited to said display capabilities;

downloading and displaying said document from said server to said mobile communication device with said preview table component embedded in said document at the location of said table, wherein said preview table component displays a portion of the table without any additional requests to said server; and wherein said iterating further comprises iterating said preview table component and for each iterated table row command, table cell command and text segment command within said predetermined number of rows and columns and limited cell content textual information, creating a new table row command, new table cell command, and new text segment command respectively with attributes copied from each said iterated table row command table, cell command and text segment command and adding said new table row command, new table cell command, and new text segment command to said preview table component in said graph structure.

2. The process of claim 1, wherein said predetermined number of rows does not exceed four, said predetermined number of columns does not exceed four, and said cell content textual information is limited to no more than thirty-two characters.

3. The process of claim 2, further comprising incrementing an index associated with each of said new table row command, new table cell command, and new text segment command, and repeating said iterating until any said index exceeds said predetermined number of rows and columns and limited cell content textual information.

4. The process of claim 1, wherein said downloading and displaying further includes downloading a document ID associated with said table in said graph structure from said server to said device.

5. The process of claim 4, comprising generating a menu selection at said mobile communication device for initiating one of either user retrieval or viewing of said table in response to which said device transmits said document ID to said server and said server downloads said table to said device.

6. A server process comprising:

building a graph structure representing a map of a document having at least one embedded table;

iterating said graph structure and for each said table constructing and adding a preview table component as an attribute to an external component reference command, wherein said preview table component includes a predetermined number of rows and columns of said table with limited cell content textual information relative to said embedded table;

transmitting said document with said preview table component embedded in said document at the location of said table for external viewing on a mobile communication device, wherein said preview table component displays a portion of the table without any additional requests to said server; and wherein said iterating further comprises iterating said preview table component and for each iterated table row command, table cell command and text segment command within said predetermined number of rows and columns and limited cell content textual information, creating a new table row command, new table cell command, and new text segment command respectively with attributes copied from each said iterated table row command table, cell command and text segment command and adding said new table row command, new table cell command, and new text segment command to said preview table component in said graph structure.

7. The server process of claim 6, wherein said predetermined number of rows does not exceed four, said predetermined number of columns does not exceed four, and said cell content textual information is limited to no more than sixteen characters.

8. The server process of claim 6, further comprising incrementing an index associated with each of said new table row command, new table cell command, and new text segment command, and repeating said iterating until any said index exceeds said predetermined number of rows and columns and limited cell content textual information.

9. The server process of claim 6, wherein said downloading and displaying further includes downloading a document ID associated with said table in said graph structure.

* * * * *